Sept. 17, 1957  L. J. ZERBEE  2,806,513
REINFORCED SCREEN WIRE RESILIENT SUPPORT
Filed March 3, 1954
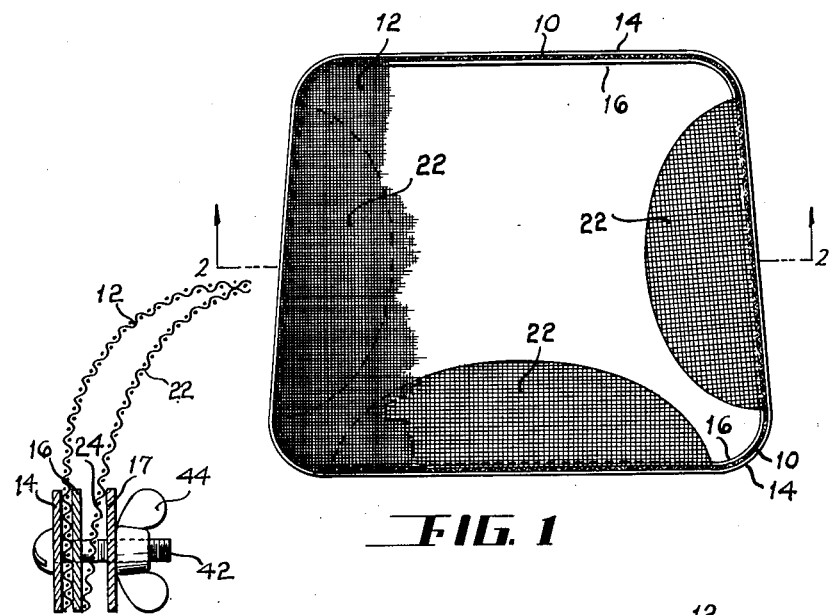
FIG. 1
FIG. 4
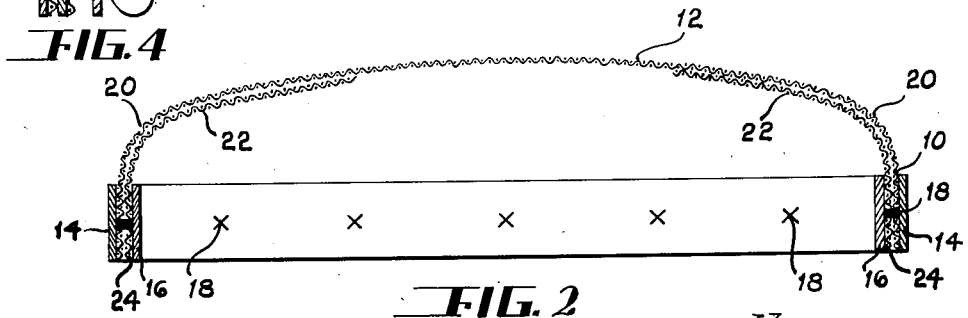
FIG. 2
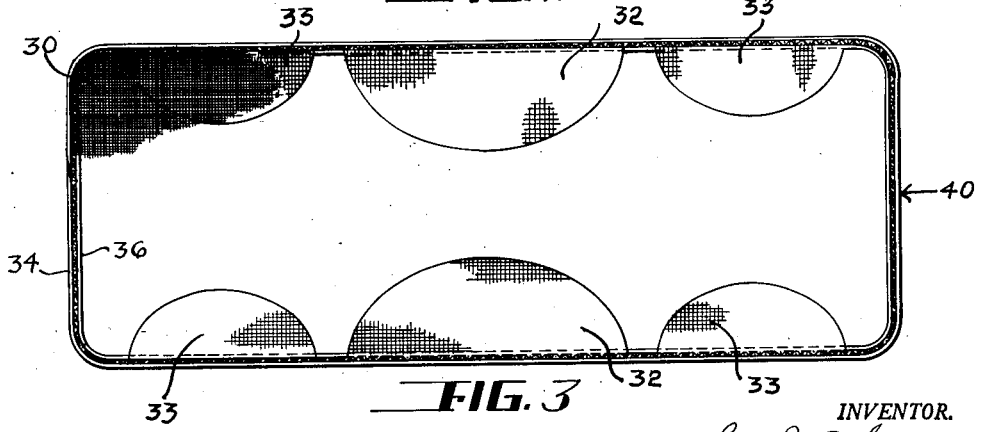
FIG. 3
INVENTOR.
Louis J. Zerbee
BY
HIS ATTORNEYS United States Patent Office 2,806,513
Patented Sept. 17, 1957

2,806,513
REINFORCED SCREEN WIRE RESILIENT SUPPORT

Louis J. Zerbee, Bellefontaine, Ohio

Application March 3, 1954, Serial No. 413,769

10 Claims. (Cl. 155—187)

This invention relates to a reinforced screen wire resilient support, and more particularly to reinforcements for cushions for seats, sofas, davenports, cots, bed springs, seats for automobiles, buses, trucks, tractors, airplanes and the like where the cushioning effect is obtained from the use of steel or other resilient wire mesh.

An object of the invention is the provision of a new type of reinforcement in seat cushions, bed springs and the like, which depend for their resiliency upon wire mesh made of steel of high carbon content, or other alloy of high tensile strength, including certain types of plastics.

Applicant's United States Letters Patent No. 2,579,284, December 18, 1951, and No. 2,126,439, August 9, 1938 show devices of this type using high carbon steel wire mesh. After long continued use of the devices of these patents, applicant has found that occasional breaking and failure occur at areas where the wire mesh was curved or bent. This was especially true of the areas along the side curved edge of a seat, and, more rarely, along its front. These areas are the ones which receive stress and shock when load is applied to these devices in use, and they are the ones which receive shock, as in bumps encountered in automobile travel, or shocks encountered in the landing of an airplane. These locations of stress occur rarely at the back of a seat, most often at the sides and front, and at the curved edges along both sides of a bed spring.

A further object of the present invention is the provision of reinforcements at these points of wear, and the prevention of their failure.

A further object of the invention is the provision of a reinforcement in shock receiving areas which is so constructed that it is able to function as a snubber, to receive and lessen shock.

A further object of the invention is increase in comfort, lessening shock, and prolonging the life of cushioned and resilient seats, beds, mattresses, and like devices.

A further object of this invention is the provision of a new type of reinforcement and shock absorber for inclusion in cushioned furniture, and one which is applicable at any point of wear; and more particularly the provision of a wire mesh reinforcement with a leaf spring or cantilever effect for wire mesh resilient cushions in any vulnerable area.

A further object of this invention is the provision of a leaf spring or cantilever reinforcement which meshes with the material of a cushion to function as a snubber and receive shocks.

Other objects and advantages reside in the construction of parts, the combination thereof and the mode of operation as will become more apparent from the following description.

Figure 1 is a top plan view of applicant's reinforced screen wire resilient support.

Figure 2 is a cross section taken substantially on the line 2—2 of Figure 1.

Figure 3 is a bottom view of a bed or sofa spring, showing applicant's reinforcement on both sides.

Figure 4 is a modification showing adjustable securing means.

Referring more in detail to the drawing, the edges 10 of a section of woven mesh 12 made of high carbon steel, or any other material possessing the required qualities of resiliency and tensile strength, are bent and held between a pair of resilient steel bands or hoops 14 and 16. Spot welds are indicated at 18, but other means, such as rivets, bolts, clamps, et cetera, may be used for this purpose. The outer strap or hoop is indicated at 14 and the inner one at 16. These hoops are disposed in parallelism, and provide the form or shape, that is, the lateral width and breadth of the cushion. This was, in part, the subject of applicant's patents above noted.

The member 12 is held curved in contour, and when load is applied in use, the curved upper portion becomes straight or concave, and stresses are transmitted to the area of bending indicated at 20. The hoops 14 and 16 bend or flex outwardly at their lower edges, thus receiving a portion of the stress, but the greater portion must be received by the areas 20 of the mesh cushion itself, and failure and breaking in these areas occur first.

Characteristic of high carbon steel wire is high strength and high resiliency. Some of the new plastics also have these qualities. Applicant utilizes these qualities by inserting spring leaves or snubber sections or cantilevers of these materials at vulnerable points, drawing their edges as shown at 24 between the steel hoops 14 and 16 so that they lie adjacent the edges 10 of the main portion 12 of the wire mesh cushion. They may be spot welded in place, or secured in any other desired manner at the same time the main cushion is secured. They may also be applied between the inside band 16 and a third band, shown at 17 in Figure 4, which may be positioned by means of screws, clamps, or in any other desired manner in such a way as to increase or decrease the tension of the sections 22 against the main cushion 12. Such adjustment tends to make the cushion more suitable to the task imposed upon it, whether it is the weight of the occupant, or the type of service it is used in, such as domestic seating, industrial seating, pleasure automobiles, trucks, tractors, airplanes and the like. Due to the fact that the two layers of wire cloth, that is, the cushion 12 and the leaf section 22, mesh one with the other, there is a dampening or snubbing action when they move in relation with each other. This snubbing action is facilitated by the woven wires being corrugated. This is particularly desirable on tractors and other vehicles moving over rough roads or fields and the like. A plurality of leaves or snubbing sections of different sizes or the same size may be used together to bring about other adjustments such as to withstand the shock of landing planes.

The resiliency and strength of these sections 22 support the main cushion 12 at the areas where most wear occurs. The sections 22 are shown as sectors terminating in substantial arcs or semi-circles, but the invention is not limited to this configuration. The action of the mesh sections 22 is substantially that of a leaf spring, a cantilever, and a shock absorber. The thrusting action of the section or leaf is always in a direction to support and strengthen the main mesh body portion at its areas of greatest stress. The curvature in these areas is kept more gradual, and breaking due to sharp bending is eliminated. The marginal portions of the main body function in a manner similar to a cantilever designed to deflect uniformly throughout its length.

Figure 3 shows a spring 40 for a bed, a sofa, a davenport, an innerspring mattress, a cot or the like. The main wire mesh portion 30 is held between the steel hoops 34 and 36, and are secured by spot welding or other means. A pair of supporting sections 32 are placed at the mid portion of each side. These are the areas of greatest stress. Two additional smaller wire mesh sections 33 are provided adjacent the end along the sides of the spring 40. These are also areas of stress. Their failure is prevented, and their life is lengthened by the additional strength and support afforded by the use of applicant's device.

Instead of separate pieces of woven wire screen reinforcing members, similar results may be obtained by inserting short pieces of weft wires parallel to the weft wires along the sides of the cushion, and inserting short pieces of warp wires parallel and between the warp wires along the front of the seat. In other words, the reinforcing or leaf sections may be made by interweaving into the main cushion body.

In Figure 4 a modified form of means for securing the leaf sections in place is shown. This form of the invention is designed also to provide adjustment of the tension to be applied to the leaf section, and to control its closeness to the main cushion body. The cushion 12 is held between the two bands or hoops 14 and 16 in the manner described above. The edges 24 of the leaves 22 are held between the hoop 16 and a third hoop 17. A screw threaded bolt 42 and an adjustable wing nut 44 secures the band 17 and the leaf section 22 to the other hoops. The member 17 may be a continuous band, or a sectional one.

It is thus possible to remove and insert any leaf section desired, for repair or for any other purpose, and to adjust, by means of a wing nut 44, the tension exerted by the leaf spring section, and its closeness to and intermeshing with the main cushion. The snubbing action is thus controllable to varied conditions of use.

It must be noted that wherever the word "wire" is used, its intended scope is not limited to metallic wire, but includes also any material which has sufficiently high resilience and high tensile strength to be useful for the purposes described. Certain plastics have these qualities.

Although the preferred embodiment of the device has been described, it will be understood that within the purview of this invention various changes may be made in the form, details, proportion and arrangement of parts, the combination thereof and mode of operation which, generally stated, consist in a device capable of carrying out the objects set forth, as disclosed and defined in the appended claims.

Having thus described my invention, I claim:

1. A cushion assembly comprising a pair of steel bands disposed in parallelism and bent to form an enclosure, a cushion member of resilient wire mesh, the edges of said cushion member being secured between said steel bands and forming a curved surface, resilient wire mesh leaf sections secured at their edges between said bands, said mesh leaf sections having interwoven longitudinal and transverse wire members, said wire members engaging the wire mesh of the cushion to deter relative movement of the mesh leaf sections and the cushion member, said mesh leaf sections being disposed underneath the main cushion member at areas of greatest stress to support, to reinforce and to graduate the curvature of said areas.

2. A cushion assembly comprising a cushion member made of resilient wire mesh, said cushion member being curved at areas adjacent its edges, and reinforcing spring leaf members having means engaging the cushion member to deter relative movement of the spring leaf members and the cushion member, said spring leaf members being disposed beneath and in contact with said cushion member at areas of stress to maintain a gradual curve, to provide support and to provide snubbing action.

3. A cushion assembly comprising a cushion member made of resilient woven mesh material, said cushion member having warp wires and weft wires and being curved at areas adjacent its edges, and reinforcements added to said cushion member at areas of stress to reinforce said areas and maintain a gradual curve, said reinforcements comprising additional short weft wires lying parallel to the weft wires of the cushion member along the sides thereof and short additional warp wires lying parallel to the warp wires along the front of said cushion member, said weft and warp wires engaging the wires of the cushion member so as to deter relative movement of the reinforcements with respect to the cushion member.

4. A cushion assembly comprising a cushion member made of highly resilient woven mesh material, said cushion member having warp elements and weft elements and being curved at areas adjacent its edges, and reinforcing elements disposed in contact with said cushion member at areas of stress to maintain a gradual curve, said reinforcing elements comprising additional short weft elements disposed parallel and in contact with the weft elements of said cushion member, said short weft elements engaging the elements of the cushion member to deter relative movement between the reinforcing elements and the cushion member.

5. A cushion assembly comprising a pair of steel hoops disposed in parallelism, a cushion member of resilient wire mesh the entire periphery of which is secured between said hoops, a plurality of resilient mesh leaves secured at one edge to said hoops and extending underneath and in contact with said cushion member to mesh with it and provide snubbing action.

6. A cushion assembly comprising a resilient wire cushion member, a pair of parallel hoops for securing the entire periphery of said cushion, a plurality of resilient wire mesh snubbing members disposed beneath portions of said cushion member, and adjustable means for securing the linear edges of said snubbing members adjacent the edges of said cushion member to provide control of tension of said snubbing member.

7. A cushion assembly comprising a resilient wire cushion member, a pair of parallel hoops for securing the entire periphery of said cushion member, a plurality of resilient wire mesh snubbing members disposed beneath portions of said cushion member, and adjustable means for securing the edge of said snubbing members adjacent the edges of said cushion member to provide control of tension of said snubbing members, said adjustable means comprising a third hoop disposed in parallelism with said pair of hoops, and inwardly thereof, the edge of said snubbing members being confined between the third hoop and the innermost one of the pair, a threaded bolt extending through said three hoops and the edges of said cushion member and said snubbing members, a wing nut for securing and adjusting the closeness of said third hoop and snubbing member with reference to the first mentioned hoops and said cushion member.

8. A cushion assembly comprising a resilient wire mesh cushion member, snubbing members mounted at intervals beneath said cushion member to reinforce said cushion member and absorb shocks encountered in use, said snubbing members being made of wire fabric contacting and meshing with said cushion member, and means for adjusting the closeness of contact of said cushion member and said snubbing member.

9. A cushion assembly for a chair or the like including an arcuate fabricated screen woven from transversely resilient wires, a pair of concentric support members, one positioned inside of the other, the margins of said screen secured between said concentric support members, said screen forming corrugations, a plurality of cantilevered supports fastened to said support members and positioned adjacent the cushion, the cantilevered supports being of wire mesh so as to form corrugations which are offset from the corrugations in the cushion and frictionally engage them so that the cantilevered supports dampen the up and down movement of the cushion.

10. A cushion device for a chair or the like including an arcuate fabricated screen woven from transversely disposed resilient wires, a pair of concentrically disposed hoop members for supporting the cushioning device therebetween, a plurality of cantilevered metallic screen supports fastened to said hoops, means for adjusting the resiliency of said cushion and said screen supports, said means comprising an adjustable hoop means spaced from the other pairs of hoops, and clamping means for varying the force of said hoop on said cantilevered supports.

References Cited in the file of this patent

UNITED STATES PATENTS

| | | |
|---|---|---|
| 849,118 | Garber | Apr. 2, 1907 |
| 1,020,407 | Foster | Mar. 19, 1912 |
| 1,047,447 | Rea | Dec. 17, 1912 |
| 2,126,439 | Zerbee | Aug. 9, 1938 |
| 2,278,049 | Zerbee | Mar. 31, 1942 |

FOREIGN PATENTS

| | | |
|---|---|---|
| 458,586 | Italy | July 10, 1950 |